E. A. Jeffery.
Cotton Bale Tie.

Nº 22,369.  Patented Dec. 21, 1858.

UNITED STATES PATENT OFFICE.

EDWIN A. JEFFERY, OF CORNING, NEW YORK.

IMPROVEMENT IN HOOP-LOCKS.

Specification forming part of Letters Patent No. 22,369, dated December 21, 1858.

*To all whom it may concern:*

Be it known that I, EDWIN A. JEFFERY, of Corning, in the county of Steuben and State of New York, have invented a new and Improved Hoop-Lock for Securing Together the Ends of a Bale-Hoop; and I do hereby declare that the following is a full, clear, and exact description of the same, reference being had to the annexed drawings, making a part of this specification, in which—

Figure 1:
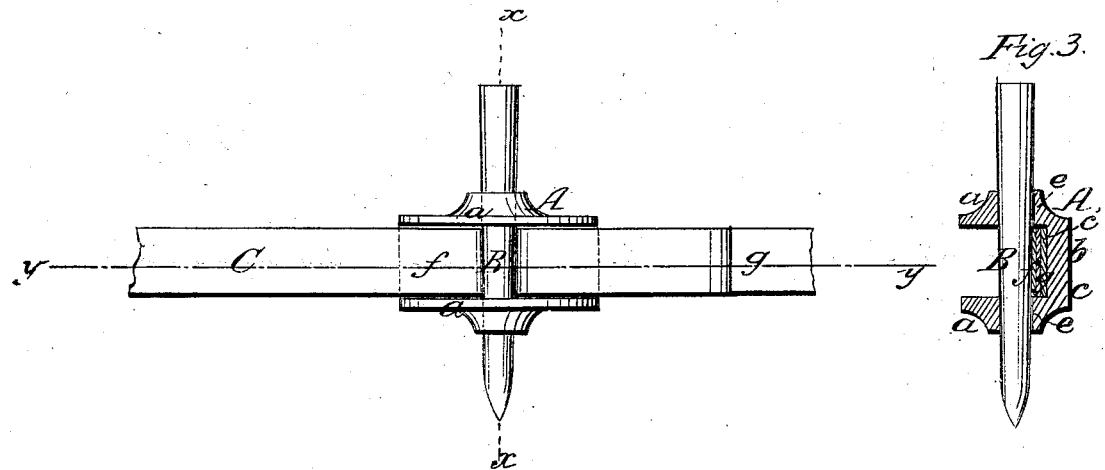
Figure 3:
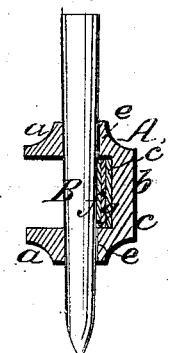
Figure 2:
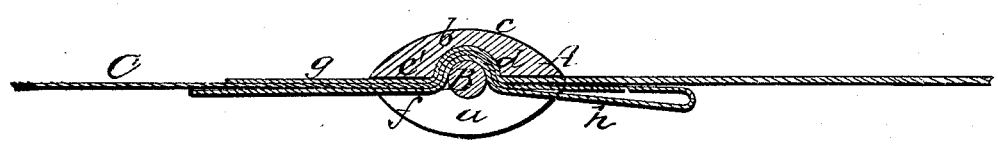

Figure 1 is an inner side view of my invention applied and securing together the ends of a bale-hoop. Fig. 2 is a section of the same, taken in the line $y\ y$, Fig. 1. Fig. 3 is also a section of the same, taken in the line $x\ x$, Fig. 1.

Similar letters of reference indicate corresponding parts in the several figures.

This invention consists in having a metal socket or shell provided with a recess or indentation, and a conical pin or key which passes through the socket, as hereinafter shown, whereby the ends of the hoop, by being looped or doubled and fitted in the socket, may be firmly secured or connected together.

To enable those skilled in the art to fully understand and construct my invention, I will proceed to describe it.

A represents a socket or shell, which may be of cast metal, and formed of two lips, $a\ a$, projecting at right angles from a back piece, $b$, at opposite ends, as shown clearly in Fig. 3. The back piece, $b$, may have its outer side, $c$, of convex form, and its inner side, $c'$, may be a plane having an indentation or groove, $d$, formed in it longitudinally and centrally, and each lip $a\ a$ has a circular hole, $e$, made through it, said holes being in line with the indentation or groove $d$. The lips $a\ a$ of the socket or shell A may also have convex edges, so that the back piece, $b$, and lips $a\ a$ will form an ellipsoid. (See Fig. 2.)

B is a metal pin of conical or taper form, as shown clearly in Figs. 1 and 3. This pin is made of such diameter that it may be driven in the holes $e$ of the lips $a\ a$.

C is a metal hoop, the two ends $f\ g$ of which are overlapped and placed in the socket or shell A. One or both ends of the hoop may be lapped or doubled, as shown at $h$, Fig. 2. The ends $f\ g$ of the hoop are placed against the plane inner surfaces, $c'$, of the socket or shell, and the pin B is driven in the holes $e$, and in consequence of said pin being of conical or taper form the ends of the hoop will be forced and bound in the indentation or groove $d$, and the loops $h$ will effectually prevent the slipping and casual detachment of the same.

This invention, it will be seen, may be constructed at a trifling cost. The ends of the bands may be connected and also detached with the greatest facility. The pin B requires to be simply driven in and out of the socket or shell A, the ends of the hoop, one or both, being fitted therein and looped or doubled, if necessary, in order to effectually prevent the slipping of the same.

From the above description it will be seen that the shape of the shell or socket A is not essential. Various forms may be used; but the one herein represented would probably be as convenient as any. I therefore do not confine myself to any particular form or shape of socket or shell, for any form would answer that will admit of the pin being driven in it transversely with the ends of the hoops.

Having thus described my invention, I claim as an improved article of manufacture—

A hoop-lock composed of a shell or socket, A, and a taper pin, B, made as herein shown and described.

EDWIN A. JEFFERY.

Witnesses:
A. N. ROGERS,
GEO. M. CLARK.